United States Patent [19]
Barakitis et al.

[11] 3,986,236
[45] Oct. 19, 1976

[54] METHOD OF SEALING ALUMINA ARC TUBE

[75] Inventors: Nikolaos Barakitis, Haverhill; Edward A. Webb, Reading; Francis B. Makar, Jr., Beverly, all of Mass.

[73] Assignee: GTE Sylvania Incorporated, Danvers, Mass.

[22] Filed: Dec. 12, 1974

[21] Appl. No.: 531,936

Related U.S. Application Data

[62] Division of Ser. No. 445,063, Feb. 25, 1974, Pat. No. 3,886,392.

[52] U.S. Cl. .............................................. 29/25.15
[51] Int. Cl.² ........................................... H01J 9/24
[58] Field of Search ............ 29/25.13, 25.15, 25.16; 316/17, 18, 19, 20; 313/220

[56] References Cited
UNITED STATES PATENTS

| | | | |
|---|---|---|---|
| 3,693,007 | 9/1972 | Kerekes | 313/222 |
| 3,866,280 | 2/1975 | Barakitis | 29/25.15 |
| 3,898,504 | 8/1975 | Akutsu et al. | 313/220 |

*Primary Examiner*—Richard B. Lazarus
*Attorney, Agent, or Firm*—James Theodosopoulos

[57] ABSTRACT

A niobium metal tube is sealed in the axial hole of a cylindrical alumina plug using a high temperature sealing glass. The plug is then sealed, at a lower temperature, in the end of an alumina arc tube.

1 Claim, 1 Drawing Figure

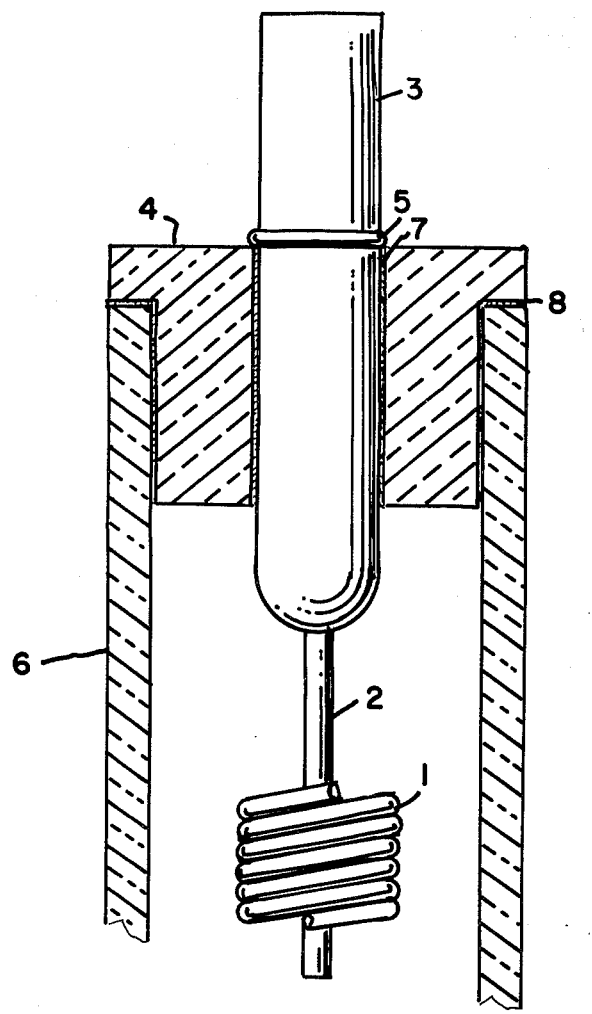

METHOD OF SEALING ALUMINA ARC TUBE

This is a division, of application Ser. No. 445,063, filed Feb. 25, 1974 now U.S. Pat. No. 3,886,392.

BACKGROUND OF THE INVENTION

1. Field Of The Invention

This invention relates to the sealing of alumina arc tubes for arc discharge lamps and in particular to high pressure sodium (HPS) vapor lamps.

2. Description Of The Prior Art

Within the past few years, high pressure sodium vapor lamps have become commercially useful, especially for outdoor lightning applications, because of their high efficiency, generally in excess of 100 lumens per watt. The sodium operating vapor pressure in such lamps is of the order of about 50 to 100 Torr.

Such lamps are called high pressure in order to distinguish them from low pressure sodium vapor lamps in which the sodium operating vapor pressure is in the order of a few microns. Low pressure sodium lamps have been in use for about 30 years but, although efficient, they produce an unattractive monochromatic yellow light. The color of light from HPS lamps is considerably improved over that from low pressure sodium lamps.

HPS lamps generally comprise an alumina ceramic arc tube containing a fill including sodium, mercury and an inert gas. Disposed at the ends of the arc tubes are metal electrodes and the ends of the arc tube are sealed with ceramic to metal seals.

A common method of manufacture of the arc tube involves the use of an alumina washer. The washer is disposed on the end of the arc tube with a glass seal ring therebetween. A niobium tube, containing an electrode on its inner end, is then inserted through a hole in the alumina washer with part of the niobium tube protruding externally. A second glass sealing ring is disposed around the niobium tube and rests on the alumina washer. The assembly is then heated to the melting point of the glass sealing rings to form the ceramic to metal seal. The first ring seals the alumina washer to the arc tube. The second ring seals the niobium tube to the alumina washer.

A problem resulting from this method of manufacture is the deposition of an undesirable dark material at the ends of the arc tube. This deposit is undesirable since it reduces the light transmission of the arc tube. The deposit occurs as a result of a reaction between the glass sealing material and the niobium tube.

SUMMARY OF THE INVENTION

In this invention the niobium tube is first sealed to an alumina plug prior to insertion thereof into an alumina arc tube. Thus the reaction product, resulting from the reaction of glass sealing material with the niobium tube, cannot deposit on the alumina arc tube. The alumina plug assembly is then sealed into the end of the alumina arc tube at a sealing temperature lower than the first sealing temperature in order to avoid the possibility of deposition of reaction product on the arc tube wall.

BRIEF DESCRIPTION OF THE DRAWING

The single FIGURE in the drawing is a sectional view of an alumina arc tube sealed in accordance with this invention.

DESCRIPTION OF THE PREFERRED EMBODIMENT

As shown in the drawing, an electrode for an HPS arc discharge lamp comprises a tungsten coil 1 mounted on a refractory metal rod 2. Rod 2 is welded or brazed to the end of a niobium tube 3 which positions and supports the electrode within arc tube 6. The internal end of niobium tube 3 is vacuum tight sealed.

Niobium tube 3 extends through a hole in cylindrical alumina plug 4 and is axially aligned therein by a raised peripheral seating ring 5 on niobium tube 3. For this purpose, the outer diameter of seating ring 5 is slightly larger than the diameter of the hole in alumina plug 4, for example, 150 mils versus 138 mils.

Next, a sealing glass frit ring is disposed around niobium tube 3, resting on alumina plug 4. The sealing glass has a composition of the type commonly used in the sealing of alumina arc tubes for HPS lamps and consists mainly of alumina and alkaline earth oxides, primarily, calcia.

The assembly, comprising niobium tube 3, alumina plug 4 and the frit ring, is then placed in a vacuum furnace with tube 3 in a vertical position, the electrode end thereof downward. The furnace is then evacuated to a submicron vacuum and sufficient heat is applied to the assembly to cause the sealing glass to melt and flow; this temperature is about 1400° C. The glass, indicated as 7 in the drawing, flows completely around niobium tube 3 and into the capillary space between tube 3 and alumina plug 4. Said capillary space is only a few mils thick. During this melting step, vertical downward pressure may be applied to the upper end of niobium tube 3 to maintain perpendicularity and uniform seating on alumina plug 4.

It is during this first melting step that any reaction between the sealing glass and the niobium tube can occur, which results in the dark reaction product that has discolored prior art arc tubes. However, the arc tube is not present during this first melting step and, therefore, is not discolored.

After removal from the furnace, the alumina plug-niobium tube assembly is then placed in the end of cylindrical alumina arc tube 6. Alumina plug 4 has a large diameter section and a small diameter section. The small diameter section is smaller than the inside diameter of arc tube 6 and thus fits therein. The large diameter section rests on the end of arc tube 6. In one example, for a 150 watt arc tube 3 inches long having an O.D. and I.D. of 275 and 220 mils, respectively, plug 4 was 5 mm long overall and had a small diameter section 3½ mm long by 217 mils diameter; the large diameter section was 1½ mm long by 275 mils diameter.

Sealing is accomplished by use of another sealing glass frit ring placed between the end of arc tube 6 and the large diameter section of alumina plug 4. The assembly is placed in a suitable furnace and heated, in an inert atmosphere, to melt the sealing glass. The glass is melted at a lower temperature than the previous melting step, say, about 1350° C, to avoid deposition of reaction products on arc tube 6. The sealing glass 8 flows into and fills the capillary space between plug 4 and arc tube 6. As during the first melting, vertical downward pressure may also be applied at the upper end of niobium tube 3 during the second melting step. Since the frit which melts has no contact with the niobium tube, there is no reaction product to deposit on the arc tube wall.

An advantage of this invention is that it provides a reliable seal for monocrystalline alumina arc tubes, as well as for polycrystalline arc tubes, without the need of a niobium end cap of the type shown in U.S. Pat. No. 3,243,635. In contrast, other sealing methods, such as shown in 3,564,328 and 3,609,437, that obviate niobium end caps, can only be used with polycrystalline alumina arc tubes.

We claim:

1. In the manufacture of a high pressure sodium arc discharge lamp, the steps comprising: inserting an electrode-bearing niobium tube through a hole in a cylindrical alumina plug, the plug having a large diameter and a small diameter section; sealing said niobium tube to said plug by filling the capillary space therebetween with a first sealing glass at a temperature above the melting point temperature of said first sealing glass; placing the tube-plug assembly partially into the end of an alumina arc tube, the small diameter section of the plug being inserted into the arc tube and the large diameter of the plug remaining outside the arc tube; and sealing said assembly to the arc tube by filling the capillary space between both sections of the plug and the arc tube with a second sealing glass having a lower melting point temperature than said first sealing glass at a temperature above the melting point temperature of said second sealing glass.

* * * * *